United States Patent [19]

Ohki et al.

[11] 4,157,568
[45] Jun. 5, 1979

[54] METHOD AND APPARATUS FOR OPTICALLY REPRODUCING A ROTATABLE RECORD WITH A SCANNING LIGHT BEAM OF CHANGING SIZE

[75] Inventors: Hiroshi Ohki, Tokyo; Takashi Otobe; Chiaki Kojima, both of Yokohama, all of Japan

[73] Assignee: Sony Corporation, Tokyo, Japan

[21] Appl. No.: 855,303

[22] Filed: Nov. 28, 1977

[30] Foreign Application Priority Data

Nov. 30, 1976 [JP] Japan .................................. 51-144563

[51] Int. Cl.² .............................................. G11B 7/18
[52] U.S. Cl. ............................. 358/128; 179/100.3 V; 179/100.4 C
[58] Field of Search .............. 358/128; 179/100.3 V, 179/100.3 N, 100.4 C, 100.4 D

[56] References Cited

U.S. PATENT DOCUMENTS

| | | | |
|---|---|---|---|
| 3,423,524 | 1/1969 | Bradford | 179/100.3 V |
| 3,646,259 | 2/1972 | Schuller | 179/100.4 D |
| 3,906,152 | 9/1975 | Hoogendijk | 179/100.3 V |
| 4,038,679 | 7/1977 | Bouwhuis et al. | 358/128 |
| 4,118,734 | 10/1978 | Bouwhuis et al. | 358/128 |

FOREIGN PATENT DOCUMENTS

| | | | |
|---|---|---|---|
| 2429850 | 1/1975 | Fed. Rep. of Germany | 358/128 |
| 1479294 | 7/1977 | United Kingdom | 358/128 |

*Primary Examiner*—Bernard Konick
*Assistant Examiner*—Donald E. McElheny
*Attorney, Agent, or Firm*—Lewis H. Eslinger; Alvin Sinderbrand

[57] ABSTRACT

A rotatable record carrier upon which reproducible information is recorded in the form of spaced apart pits in substantially concentric circular tracks on a surface of the carrier. The pits may represent frequency-modulated information signals, and the lengths of the pits are independent of the frequency of the information signals. A method and apparatus for reproducing information from this record carrier is disclosed, wherein a light beam is used to scan the tracks of the record medium, and the size of the scanning light beam is changed as a function of the radius of the track which then is being scanned so as to increase the size of the beam when a track of larger radius is scanned. This control over the size of the scanning beam establishes a constant relationship between the size of the beam and the length of the pits despite changes in the pit length due to the different radii of the tracks.

18 Claims, 20 Drawing Figures

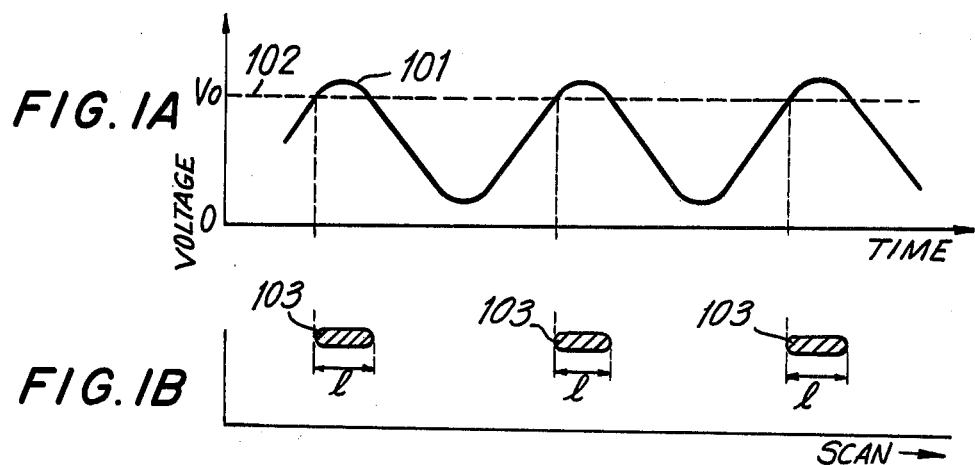
PRIOR ART
FIG.1A
FIG.1B
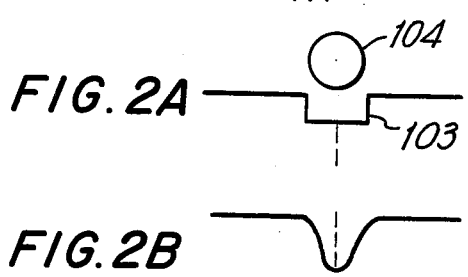
PRIOR ART
FIG.2A
FIG.2B
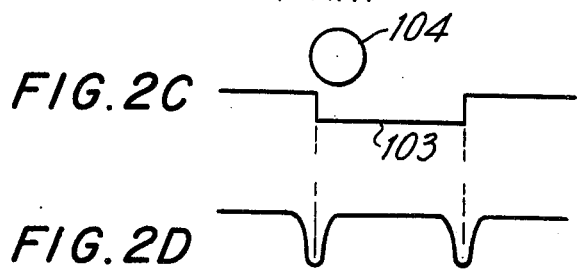
PRIOR ART
FIG.2C
FIG.2D
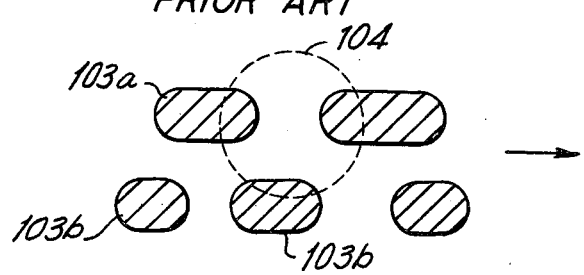
PRIOR ART
FIG.3

METHOD AND APPARATUS FOR OPTICALLY REPRODUCING A ROTATABLE RECORD WITH A SCANNING LIGHT BEAM OF CHANGING SIZE

BACKGROUND OF THE INVENTION

This invention relates to the reproduction of information from a rotatable record medium and, more particularly, to such a method and apparatus wherein the information is recorded in the form of spaced apart pits in substantially concentric circular tracks, the tracks being scanned by a light beam of controllable size.

Information which exhibits a relatively wide bandwidth should be recorded by a record carrier with a relatively high recording density. This, of course, enables a large amount of information to be recorded and subsequently reproduced from the record carrier. As an example, optical recording and reproducing techniques are known to exhibit favorably high recording densities. By using such techniques, video information, which exhibits a relatively wide bandwidth, may be recorded in, for example, spiral or substantially concentric circular tracks on a rotatable record disc. When such video information is recorded in optically reproducible form, such as by recording the video information in the form of optically detectable pits in the substantially circular tracks, a light beam is caused to scan successive tracks wherein the pits serve to modulate the intensity of the beam. This modulated light beam then is detected, either by transmitting the modulated beam or reflecting the modulated beam to a suitable photodetecting device, thereby recovering the recorded video information.

When video information is recorded in the aforementioned manner, the width of each substantially circular track and the lengths of the respective pits are extremely small. This is a desirable feature in order to achieve a high recording density. This also is necessary in order to provide a record disc of a suitably long playing time. As an example, if one frame of video information is recorded in each track, then, for the NTSC system, thirty frames must be reproduced each second, thereby requiring an angular velocity of the disc of 1800 rpm. Thus, track width and pit length must be small to permit a large number of tracks to be recorded on the disc.

One technique for recording video information in the form of pits in concentric tracks employs frequency modulation of the video signal, and the recorded pits represent such frequency modulations. More particularly, a clipping level is established and the frequency modulated video signal is compared to this clipping level. During each cycle, that portion of the frequency modulated video signal which exceeds the clipping level is recorded in the form of a pit whose length is proportional to the duration of the cycle which exceeds the clipping level. Thus, as the frequency component of the video signal changes, the length of the pit changes inversely.

Not only does the length of a pit vary with the frequency component of the frequency modulated signal, but pit-length also is dependent upon the radius of the track in which the pit is recorded. In fact, the radial dependency of the length of the pits is more pronounced than the frequency dependency thereof. To appreciate this, let it be assumed that the same frequency component is recorded in a track whose radius is, for example, 15 cm. and in a track whose radius is, for example, 5 cm. When the pits in both tracks are recorded, the duration of the frequency modulated signal which exceeds the clipping level is identical. However, since the linear speed of the track whose radius is 15 cm. is three times greater than the linear speed of the track whose radius is 5 cm., the length of the pit which is recorded in the track of greater radius is three times as long as the length of the pit which is recorded in the track of smaller radius. This is because the length of a pit is proportional to the product of the duration of the frequency modulated video signal which exceeds the clipping level and the linear velocity of the track.

During signal reproduction, the information which is represented by the recorded pits is recovered by scanning the record disc with a light beam. If the size of the light beam which is incident on the disc, hereinafter the size of the scanning beam spot, remains constant for the scanning of all tracks regardless of the radius of the particular track which is being scanned, then the relationship between the length of the pit and the size of the scanning beam spot will vary. That is, for longer pits which are recorded in the outer tracks, the size of the scanning beam spot may be too small relative to that pit length. However, when that same beam is used to scan the pits in the inner tracks, the size of the scanning beam spot may be too large with respect to the pits which are recorded in those inner tracks. The difficulties which may arise because of this can be explained mathematically. Let it be assumed that the length of a pit recorded in a track whose radius is, for example, 15 cm. is represented as $L_1$, and the diameter of the scanning beam spot is represented as r. The pit will be detected when the beam first impinges upon the leading edge of the pit and this detected condition will be maintained while the beam overlaps the pit and until the beam no longer impinges upon the trailing edge of the pit. Consequently, the effective detected length of the pit may be expressed as $L_1+2r$. A similar expression may be derived when the beam of constant diameter r scans a pit of length $L_2$ which is recorded in a track whose radius is 5 cm. In this latter case, the effective detected length of the pit may be expressed as $L_2+2r$. If each pit is intended to represent the identical information, such as the same frequency component, then it is expected that a pulse produced by the scanning of the longer pit will be of an identical duration as the pulse which is produced in response to the scanning of the shorter pit. This pulse duration may be expressed as the effective length of a pit divided by the linear velocity of the track in which that pit is recorded, that is, $t=L/v$. When the pit which is recorded in the track whose radius is 15 cm. is scanned, the resultant pulse duration $t_1$ may be expressed as $t_1=(L_1+2r)/v_1$, where $L_1+2r$ is the effective pit length and $v_1$ is the linear velocity of the track. Similarly, the duration of the pulse which is produced when the pit that is recorded in the track whose radius is 5 cm. is scanned may be expressed as $t_2=(L_2+2r)/v_2$, where $L_2+2r$ is the effective pit length and $v_2$ is the linear velocity of the track. In this example, since the radius of the outer track is three times as great as the radius of the inner track, then $L_1=3L_2$, and $v_1=3v_2$. When these expressions are substituted into the equation for $t_1$, then the pulse duration may be rewritten as $t_1=(3L_2+2r)/3v_2=(L_2+\frac{2}{3}r)/v_2$. Contrary to the expectation that the duration for each pulse which is produced in the respective tracks will be equal, it is seen that $t_1<t_2$. Since these pulse durations are not equal, the signal reproducing apparatus will erroneously interpret information which is recorded in tracks of different radii, provided the size of the scanning beam spot remains constant. Stated otherwise, if the size of the scanning beam spot is constant, then the change in the length of a pit due to the particular radius of the track in which the pit is recorded will result in a change in the relationship between the beam spot and the pit length. This changing relationship may result in erroneous output signals during the reproducing operation.

The changing relationship between the length of a pit and the size of the scanning beam spot may result in still further difficulties. When a proper relationship exists between the size of the scanning beam spot and the length of the pit, the pit will be detected by a change in the intensity of the light reflected therefrom, such as a reduction in the intensity of the reflected light when the beam spot impinges upon the pit. This change in the intensity of the reflected light is detected and results in the production of an output pulse. However, if the length of a pit is too long relative to the size of the scanning beam spot, then the intensity of the light which is reflected from the surface of the record disc will be reduced when the leading edge of the pit is scanned, but then the intensity returns to its "normal" level when the beam spot scans the bottom of the pit. This is because the bottom of the pit generally is reflective substantially to the same degree as the surface of the disc. However, when the beam spot next impinges upon the trailing edge of the pit, another reduction in the intensity of the reflected light is produced. Consequently, two output pulses are produced when this pit whose length is too long is scanned by the beam spot. If a single pulse is intended to represent a pit, then the production of two pulses will erroneously be interpreted as being representative of two pits. Hence, errors in the reproduced information will result.

In the foregoing example, the size of the scanning beam spot is too small for the length of the pit. However, if the size of the scanning beam spot is selected so as to be proper for the longer pits, that is, those pits which are recorded in the outer tracks, then an incorrect relationship will exist when that scanning beam spot is used to scan the shorter pits which are recorded in the inner tracks. When such shorter pits are scanned by the larger scanning beam spot, a substantial portion of the beam spot impinges upon the surrounding land, or surface of the disc. As a result, the intensity of the light which is reflected therefrom is changed only insignificantly by the scanned pit. This can be appreciated by assuming that the intensity of the light which is reflected from the disc when the scanning beam impinges upon the land or surface thereof is represented as M, and that the intensity of the light which is reflected when the scanning beam impinges upon the pit is represented as P. The modulation factor m may be defined as $m = (M-P)/(M+P)$. If the size of the scanning beam spot is too large relative to the length of the pit being scanned, as aforesaid, then the reflected light intensity P is almost equal to M. Consequently, the modulation factor m is very small. Hence, the signal-to-noise ratio (S/N) for a beam spot which is too large relative to the length of a pit is small, and the resultant output signal which is reproduced by using that beam to scan the disc is degraded. As a further disadvantage, the scanning beam spot may be so large as to impinge upon adjacent pits which are recorded either in the same or adjacent tracks. This introduces crosstalk, interference and further deterioration in the output signal. If the information which is recorded on the record disc represents video signal information, then the resultant video picture which is reproduced by scanning that disc with such a beam spot is less than satisfactory.

Although the length of a pit which is recorded in a given track may vary as a function of the information represented thereby, for example, if the pits are representative of frequency modulated information, pulse width information or the like, the dependency of pit length upon such information is not as significant as the dependency of pit length upon the radius of the particular track in which such pit is recorded. Hence, even though the length of a pit will vary as a function of such information, this variation will not result in such a large change in the relationship between the size of the scanning beam spot and the length of the pit as to cause the aforenoted problems. As a numerical example, if the length of a pit is representative of the frequency component of a frequency modulated signal, such as a frequency modulated video signal, then a typical center frequency of such a frequency modulated signal is about 8 MHz and the maximum frequency deviation of the frequency modulated signal is about 1.7 MHz. Hence, the length of a pit corresponding to a minimum frequency is about 1.2 times the length of a pit corresponding to a maximum frequency; and this pit length deviation is very small relative to the change in the length of a pit which is recorded in the innermost and outermost tracks, the length of the pit recorded in the outermost track being, for example, three times the length of a pit which is recorded in the innermost track. Hence, even though there is some variation in the length of a pit due to the information which is represented thereby, the effects caused by this small variation are negligible when compared to the aforenoted effects which are caused by pit length variation attributed to the radial dependency of such pits.

OBJECTS OF THE INVENTION

Therefore, it is an object of the present invention to provide an improved method and apparatus for reproducing information from a rotatable record medium which avoid the aforenoted problems attending prior art techniques.

Another object of this invention is to provide a method and apparatus for optically reproducing information which has been recorded in the form of spaced apart pits in substantially concentric circular tracks on a rotatable record medium wherein the size of the light beam which is used to scan the record medium is adjusted as a function of the radial position of that light beam so as to maintain a substantially constant relationship between the size of the beam and the length of the pits.

A further object of this invention is to provide a method and apparatus for reproducing information which has been recorded as pits in substantially concentric circular tracks, whereby a proper relation between the size of the light beam spot which is used for reproduction and the length of each pit can be maintained notwithstanding the radius of each track, thereby avoiding erroneous and/or degraded reproduced output signals.

An additional object of this invention is to provide an improved record carrier upon which information is recorded in the form of pits in substantially concentric circular tracks wherein the recorded information can be optically reproduced easily and accurately; and to provide a method and apparatus for producing such a record carrier.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for reproducing information which is recorded in the form of spaced apart pits disposed in substantially concentric circular tracks of a rotatable record medium. A light beam is used to scan the tracks, the intensity of the light beam being modulated by the recorded pits, such intensity modulation being detected and used to recover the recorded information. The radial position of the light beam with respect to the circular tracks is detected; and the size of the beam is changed as a function of the detected radial position thereof such that the size of the beam is larger when the beam scans tracks of a larger radius.

Another aspect of the present invention is to provide an improved record medium having substantially concentric circular tracks on a surface thereof, each track containing spaced apart pits to represent frequency-modulated information signals, with the lengths of the pits being independent of the frequency component of the frequency-modulated information signals. That is, the length of each pit is maintained constant with respect to the information represented thereby, such that the pit length varies substantially only as a function of the radius of the track in which the pit is recorded.

BRIEF DESCRIPTION OF THE DRAWINGS

The following detailed description, given by way of example, will best be understood in conjunction with the accompanying drawings in which:

FIGS. 1A and 1B represent one technique in which signal information is recorded in the form of pits on, for example, a record disc;

FIGS. 2A–2D are illustrative of the problem caused by a change in the relationship between the size of a scanning beam spot and the length of a pit during a signal reproducing operation;

FIG. 3 illustrates the manner in which a beam spot of relatively large size scans the pits recorded on a record disc;

DETAILED DESCRIPTION OF SOME OF THE PREFERRED EMBODIMENTS

Figure 4:
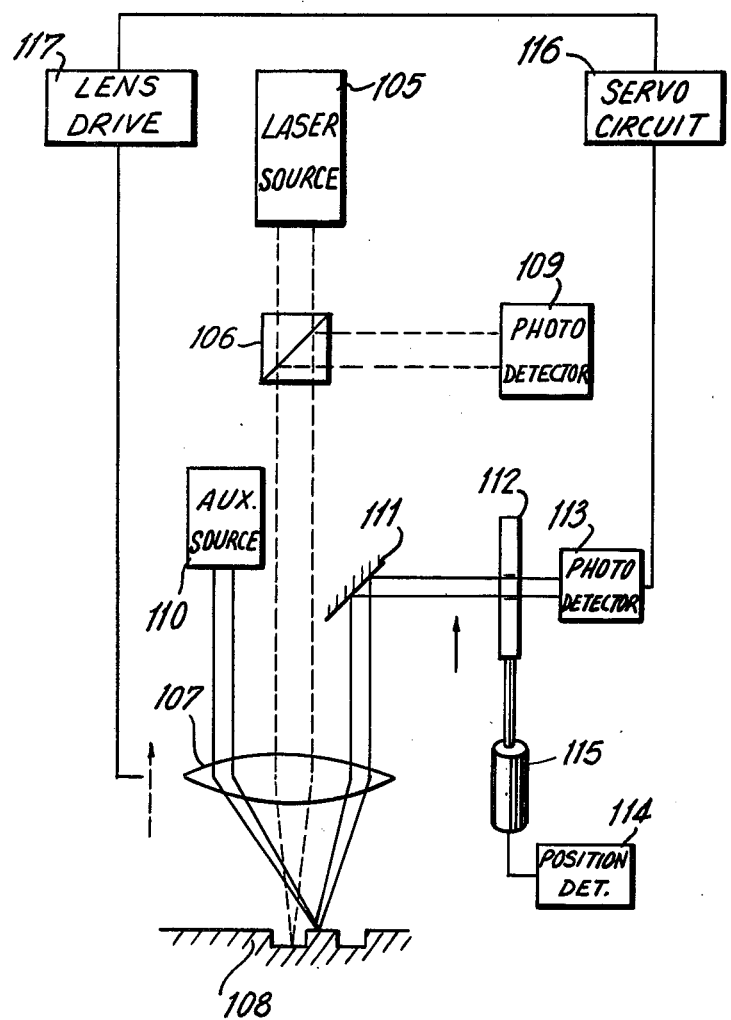
FIG. 4 is a block diagram of one embodiment of the present invention.

Referring now to the drawings, and in particular to FIG. 1, an example of a prior art signal recording technique is illustrated. FIG. 1A represents an information signal waveform 101 which, for example, may be a frequency modulated (FM) signal, such as an FM video signal. This information signal is compared to a clipping level 102 and those portions, or peaks, of information signal 101 which exceed clipping level 102 are recorded as pits of length 1 corresponding to the duration of the information signal which extends between successive clipping level excursions. Thus, as shown in FIG. 1B, the length 1 of a pit is dependent upon the frequency of information signal 101. As the frequency of information signal 101 increases, the duration of that information signal which exceeds the clipping level during each cycle decreases so as to correspondingly decrease the length 1 of the recorded pit. Conversely, as the frequency of the information signal decreases, the duration of that signal during each cycle which exceeds the clipping level is increased so as to correspondingly increase the length 1 of the pit. Also, the spacing between adjacent pits is dependent upon the frequency of the information signal.

The length 1 of a pit not only is dependent upon the frequency of information signal 101 but, even more significantly, is dependent upon the radius of the track on the record medium in which the pit is recorded. Thus, for the same frequency of the information signal, a longer pit will be recorded in an outer track, that is, a circular track having a greater radius, than is recorded in an inner track on the record medium.

An illustration of this radial dependency of the length of a pit is shown in FIGS. 2A–2D. In FIG. 2A, it is assumed that the recorded pit 103 is scanned by a light beam spot 104 in order to recover the information which is represented by the recorded pits. It is further assumed that the relationship between the size of beam spot 104 and the length of pit 103 is proper so that a pulse, such as the negative-going pulse shown in FIG. 2B, is produced when the beam spot scans the pit. If pit 103 shown in FIG. 2A is recorded in an inner track, then, for the very same frequency component, a pit 103 having the length shown in FIG. 2C will be recorded in an outer track. Let it now be assumed that, during signal reproduction, the size of beam spot 104 is maintained constant for the scanning of all tracks. Hence, as shown in FIG. 2C, the size of scanning beam spot 104 is identical to the size of the beam spot shown in FIG. 2A. However, because the length of pit 103 which is recorded in the outer track is much greater than the length of pit 103 which is recorded in the inner track, the result of scanning the longer pit with beam spot 104 is shown in FIG. 2D wherein two pulses are produced.

If the reproducing apparatus includes signal processing circuitry which is adapted to respond to the pulsese shown in FIG. 2B when beam spot 104 scans pit 103, then an erroneous result is produced when the pulses shown in FIG. 2D are generated. That is, when a longer pit recorded in an outer track is scanned, the signal processing circuitry will erroneously interpret the pulses of FIG. 2D as being representative of two separate pits. This difficulty arises when the length of a pit is too long for the size of the scanning beam spot.

If the size of beam spot 104 is sufficient to avoid the erroneous pulse condition shown in FIG. 2D when an outer track is scanned, then this beam spot may be too large with respect to the length of a pit which is recorded in an inner track. In that event, the change in the light intensity of the large beam spot caused by the scanning of the shorter pit might be so small as to be undetected. Hence, the improper relationship between the length of the pit recorded in an inner track and the relatively large size of the scanning beam spot may result in an erroneous loss of information. Furthermore, beam spot 104 may be so large that when pits which are recorded in one track are scanned, such as when pits 103a shown in FIG. 3 are scanned, beam spot 104 also impinges upon a portion of a pit 103b in an adjacent track. This crosstalk due to the scanned pit in the adjacent track may reduce the intensity of the reflected light below a threshold level such that even though beam spot 104 scans the space between adjacent pits 103a (FIG. 3), an erroneous output signal may be produced representing the detection of a pit.

The difficulties described with respect to FIGS. 2 and 3 arise as a result of the dependence of the length of a pit with the radius of the track in which that pit is recorded. Because of this radial dependency, a proper relationship between the size of a reproducing beam spot and the length of the pit cannot be obtained merely by maintaining the size of the beam spot constant. The present invention avoids these difficulties by adjusting the size of the scanning beam spot during signal reproduction as a function of the radius of the track which then is being scanned by the beam spot. Thus, when an inner track is scanned having relatively shorter pits, the size of the beam spot is controlled to be relatively small. As the radial position of the beam spot with respect to the circular tracks on the record medium is increased, that is, as the track radius increases, the size of the scanning beam spot likewise is increased.

One embodiment of apparatus which is adapted to control the size of the scanning beam spot during signal reproduction in the manner described above is illustrated in FIG. 4. This illustrated apparatus is comprised of a light source 105, an optical system including a beam splitter 106 and a lens 107 for scanning the light beam emitted by source 105 across the surface of a record medium, a photodetector 109, a radial position detector 114, and a control system including elements 110, 112, 113, 116 and 117 for suitably adjusting the size of the scanning light beam which is incident upon the record medium. For the purpose of the present discussion, it will be assumed that the record medium is a rotatable record disc formed of substantially concentric circular tracks, one of which tracks is identified by reference numeral 108, and that signal information is recorded in the form of pits in the record tracks. Light source 105 preferably is a laser source of conventional construction and is adapted to emit a light beam, hereinafter sometimes referred to as a laser beam, for scanning the circular tracks on the record disc. The optical system including beam splitter 106 and lens 107 is adapted to transmit the emitted light beam to the record disc and to focus the beam to a beam spot of suitable size for the scanning of the pits which are recorded in the tracks, such as track 108. Lens 107 is shown schematically and may be comprised of a number of optical elements forming a focusing lens system.

The intensity of the light beam, which is focused on the surface of the record disc, is modulated in accordance with the pits which are scanned thereby. As an example, when the light beam is incident on the land or surface of the disc, the beam intensity exhibits a maximum value. When the light beam is incident on a pit, the beam intensity is reduced. Thus, if the surface of the record disc is reflective, and if the bottom, or trough, of each pit likewise is reflective, then the light beam will be reflected from the record disc, and the intensity of the reflected beam will be correspondingly modulated so as to represent the presence or absence of pits. That is, the intensity of the reflected beam will be representative of the information which is recorded on the record disc. As an alternative, the light beam which is emitted by source 105 may be transmitted through the record disc, and the intensity of the beam which is transmitted therethrough will be modulated in accordance with the information which is recorded in the circular tracks on the disc. In either embodiment, the recorded information can be recovered from the intensity-modulated light beam by detecting that beam following the modulation thereof with the information which is recorded on the record disc.

For the embodiment wherein the modulated light beam is reflected from the record disc, photodetector 109 is disposed in the reflective optical path so as to receive the intensity-modulated light beam and to produce corresponding electric signals representing such intensity modulations. In FIG. 4, the light beam which is emitted by source 105 is transmitted through beam splitter 106, which may comprise, for example, a half-silvered mirror, and is focused by lens 107 onto the record disc. Preferably, this scanning light beam is transmitted through the central portion of the lens. After being modulated with the recorded information, the light beam is reflected back through lens 107 along its original light-transmission path, this reflected, modulated beam then being additionally reflected by beam splitter 106 to photodetector 109. If the scanning light beam is a laser beam, a quarter-wave plate may be positioned between source 105 and beam splitter 106 and another quarter-wave plate may be disposed in the reflective light path between lens 107 and beam splitter 106. These quarter-wave plates establish a phase relationship between the transmitted and reflected laser beams such that beam splitter 106 will reflect substantially all of the reflected laser beam to photodetector 109.

As may be appreciated, lens 107 establishes a focusing condition for the light beam which is incident on the record disc. If the position of this lens relative to the surface of the disc is changed, a corresponding change in the focusing condition of the beam will occur. This change in the focusing condition of the light beam appears as a change in the size of the incident beam spot. Thus, and as an example, if the size of the scanning beam spot is to be increased, lens 107 is displaced away from the surface of the record disc. Conversely, if the size of the scanning beam spot is to be reduced, lens 107 is displaced in a direction toward the surface of the record disc. Elements 110–117 in FIG. 4 are adapted to control the focusing condition of lens 107 and, hence, the size of the scanning beam spot. Since the focusing condition of lens 107 is controlled by these elements, such control apparatus may be referred to as a focus control system.

The focus control system includes auxiliary light source 110 and a further photodetector 113. Auxiliarly light source 110 may be a separate light souce, such as laser source, or may be formed of conventional optical elements, such as a beam splitter or the like, to derive an auxiliary light beam from the aforementioned, or main light beam which is emitted by source 105. This auxiliary light beam, which may be considered to be a focus control beam, is transmitted through the same lens 107 to the surface of the record disc. As shown in FIG. 4, the auxiliary beam is spaced radially outwardly from the central portion of lens 107 and, thus, is refracted so as to impinge upon track 108 at a distance spaced apart from the point of incidence of the main beam. In the illustrated embodiment, this auxiliary beam is reflected from the record disc to traverse a folded optical path established by a reflecting surface 111 to photodetector 113. Preferably, the size of the auxiliary beam spot which is incident on the record disc is large enough such that only negligible changes in its intensity are produced by the recorded pits. That is, the intensity of the auxiliary beam which is received by photodetector 113 is substantially constant. However, this intensity is effected by a change in the focusing condition of lens 107. That is, if, because of fluctuations, eccentricities or other disturbances in the rotation of the record disc, the distance between lens 107 and the surface of the disc changes, a corresponding change will be imparted to the size of the auxiliary beam spot which is incident on the surface of the disc. This change in intensity of the auxiliary beam is sensed by photodetector 113 which, in turn, produces an output signal representing such change. This output signal then is used to adjust the position of lens 107 relative to the surface of the record disc so as to compensate for the aforementioned change in the focusing condition. That is, if the record disc is displaced in a direction away from lens 107, the intensity of the auxiliary light beam incident on photodetector 113 increases, resulting in an output signal which is used to move lens 107 toward the record disc. Conversely, if the record disc is displaced in a direction toward the lens, the intensity of the auxiliary light beam incident on photodetector 113 is reduced, and the photodetector produces a corresponding output signal which is used to move lens 107 away from the record disc.

Servo circuit 116 is coupled to the output of photodetector 113 and is adapted to receive the signal produced by the photodetector which is representative of the intensity of the auxiliary light beam that is reflected from the record disc. In accordance with the signal received by servo circuit 116, a drive signal is applied to a lens drive mechanism 117, the latter being mechanically connected to lens 107 so as to adjust the position of the lens as a function of the drive signal produced by the servo circuit. As an example, lens drive mechanism 117 may comprise a coil which is deflected as function of the drive signal applied thereto by servo circuit 116. As may be appreciated, other suitable drive mechanisms may be used to adjust the position of lens 107.

In accordance with one embodiment of the present invention, the aforedescribed focus control apparatus is used to control the size of the scanning beam spot which is derived from source 105 as a function of the radial position of the beam spot on the record disc. That is, if the beam spot is scanning a track 108 which has a relatively shorter radius, the focus control apparatus is driven such that a relatively small beam spot is obtained. Conversely, if the beam spot is scanning a track of relatively larger radius, the focus control system is driven such that a relatively larger beam spot is obtained. This control over the size of the scanning beam spot is achieved by controlling the intensity of the auxiliary beam, which is received by photodetector 113, as a function of the radial position of the main beam spot. That is, when the main beam spot scans an inner track, the intensity of the auxiliary beam incident on photodetector 113 is made relatively high such that servo circuit 116 and lens drive mechanism 117 move lens 107 in a direction toward the record disc so as to reduce the size of the main beam spot. Conversely, when the main beam spot scans an outer track, the intensity of the auxiliary beam which is incident on photodetector 113 is reduced such that servo circuit 116 and lens drive mechanism 117 move lens 107 in a direction away from the record disc so as to correspondingly increase the size of the main beam spot.

In one embodiment of the present invention, the afore-described control over the intensity of the auxiliary beam which is incident on photodetector 113 is achieved by providing an adjustable stop 112 in intercepting relation with the auxiliary beam. Stop 112 is mechanically coupled to and driven by a drive element 115, the latter being controlled by a position detector 114. Position detector 114 is adapted to detect the radial position of the main beam spot relative to the tracks on the record disc. This position detector is described in greater detail below with respect to FIG. 5. For the present discussion, it will be understood that the position detector produces an output signal, such as a control voltage or current, which is applied to drive element 115 so as to adjust stop 112 accordingly. Stop 112 is an adjustable aperture, typical embodiments of which are described below. As an adjustable aperture, it is appreciated that the intensity of the light beam incident on photodetector 113 is determined by the opening of this aperture. Hence, adjustable aperture 112 may comprise a controllable iris, a controllable slit, or the like.

Before explaining the operation of the beam spot size control apparatus, one embodiment of position detector 114 will be described with respect to FIG. 5. As is understood, scanning of the tracks on the record disc is achieved by rotating the record disc at a substantially constant angular velocity and by providing relative movement in the radial direction between the record disc and the scanning beam. This relative radial movement may be effected either by maintaining the optical system fixed and moving the record disc, such as by displacing the rotary support in a radial direction; or, alternatively, by maintaining the record disc in a fixed radial position while radially displacing the optical system. In the embodiment of position detector 114 shown in FIG. 5, a support base, platform or carriage 121 is secured or coupled to the radially movable elements. This base is provided with a strip of indicia 122, such as magnetically detectable indicia, optically detectable indicia, or the like. Position detector 114, represented by the broken rectangle, includes a sensor element 114a, such as a magnetic or optical head, capable of sensing indicia 122. Sensor 114a is fixed with respect to base 121 such that as the base is moved, sensor 114a scans indicia 122. Thus, the indicia may be in the form of coded representations, such as code words representing the radial dimension, or may be in the form of detectable marks. If indicia 122 assume the latter form, sensor 114a is coupled to a mark counter 114b which, in turn, is coupled to a digital-to-analog (D/A) converter 114c. Thus, as base 121 is displaced relative to sensor 114a, indicia 122, in the form of marks, are sensed by the sensor which produces an output signal, such as a pulse, when each mark is sensed. These pulses, or marks, are counted by counter 114b such that the count which is accumulated by this counter corresponds to the radial position of the scanning beam relative to the tracks on the record disc. This count, which may be in digital or binary form, is converted to a corresponding analog signal, such as an analog voltage or current, by D/A converter 114c. It is this analog signal which is applied to drive element 115 of FIG. 4.

As an alternative embodiment, platform 121 may be fixed and sensor 114a may be secured or otherwise coupled to the radially movable mechanism. Similar to the foregoing description, in this alternative embodiment, sensor 114a senses indicia 122 as radial movement is provided between the record disc and the scanning beam. Thus, in either embodiment, D/A converter 114c produces an output analog signal which represents the radial position of the scanning beam, that is, the radius of the particular track which then is being scanned by the beam.

Figure 5:
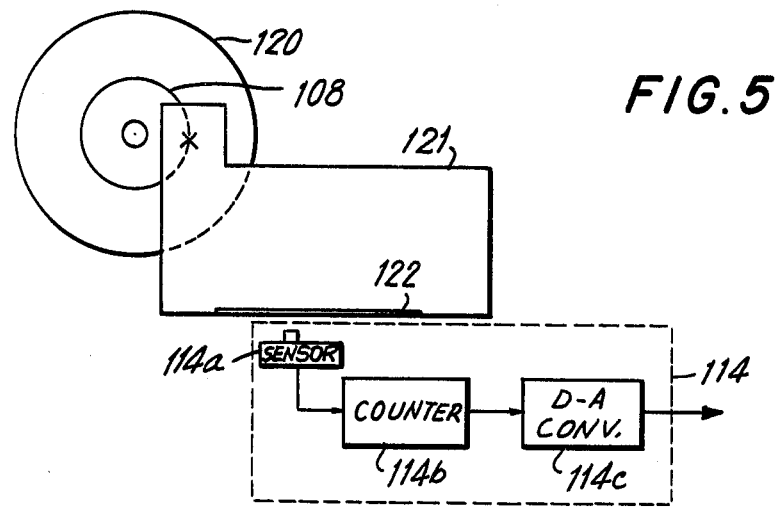
FIG. 5 is a schematic representation of the radial position detector shown in FIG. 4.

For the embodiment shown in FIG. 5, track 108 is shown as being an inner track on record disc 120. The "X" shown represents the position of the scanning beam. This radial position of the scanning beam corresponds to the relative position of sensor 114a with respect to indicia 122. Hence, if indicia 122 is in the form of marks, the count of counter 114b corresponds to the radius of track 108, and the analog signal developed by D/A converter 114c is an analog representation of that radius.

Figure 6A:
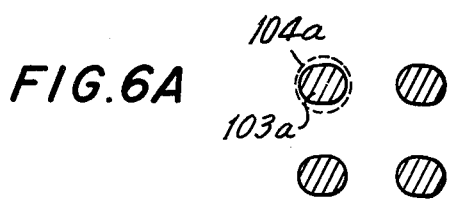
FIGS. 6A–6B show the results which are attained by the present invention.
Figure 6B:
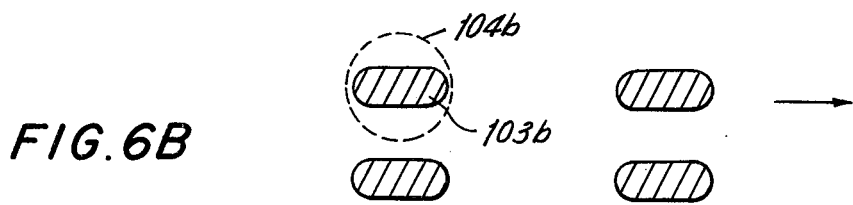

The operation of the beam spot size control apparatus shown in FIG. 4 now will be described with reference to FIGS. 6A and 6B. Let it be assumed that the light beam emitted by source 105 scans record disc 120 (FIG. 5) from the innermost track toward the outermost track. Of course, if desired, the opposite scanning direction may be adopted. As is appreciated, the length of the pits which are recorded in the inner tracks is much shorter, for the very same information signal, than the length of the pits which are recorded in the outer tracks. Accordingly, the beam spot size control apparatus is operative to increase the size of the beam spot as the radius of the track being scanned increases. When an inner track is scanned, position detector 114 applies a drive signal to drive element 115 representing the inner radial position of the beam spot. This signal is effective to control drive element 115 to adjust aperture 112 such that photodetector 113 receives the auxiliary light beam with a relatively high intensity. Consequently, servo circuit 116 controls lens drive mechanism 117 to adjust lens 107 in a direction toward the surface of the record disc. It is recalled that this has the effect of reducing the size of the main beam spot which is incident on the disc.

As the radial position of the light beam increases such that the beam scans the outer tracks, a corresponding change in the position of sensor 114a relative to indicia 122 is obtained. This change in the relative position of the sensor is reflected in the count of counter 114b and the analog signal which is produced by D/A converter 114c. Consequently, position detector 114 applies a drive signal to drive element 115 which reduces the opening of aperture 112 so as to correspondingly reduce the intensity of the auxiliary beam which is received by photodetector 113. Consequently servo circuit 116 controls lens drive mechanism 117 so as to move lens 107 in the direction away from the surface of the record disc, as shown by the broken arrow in FIG. 4. This has effect of increasing the size of the beam spot. Thus, when beam spot 104a scans pits 103a which are recorded in the inner tracks of record disc 120, as represented by FIG. 6A, the size of beam spot 104a is relatively small. However, when the beam spot scans the outer tracks wherein the length of the pits is markedly increased, such as shown by pits 103b in FIG. 6B, the beam spot size control apparatus enlarges the size of the beam spot, as represented by the larger beam spot 104b. Therefore, even though the length of the pits varies as a function of the radius of the track in which such pits are recorded, a given relationship between the size of the beam spot and the length of the pit being scanned is maintained constant. This constant relationship is appreciated by comparing FIG. 6A with FIG. 6B. In these figures, although the length of the respective pits is radially dependent, the width of such pits is constant irrespective of the radius of the track in which such pits are recorded. Thus, if the relationship between the size of the beam spot and the length of a pit is represented as the ratio of beam spot diameter to pit length, it is seen that this ratio remains constant for all scanned tracks. Consequently, if a desired relationship, or ratio, is established for the scanning of the inner tracks, this desired relationship will hold also for the scanning of the outer tracks.

It is advantageous for position detector 114 to be of the type shown in FIG. 5. This is because the use of sensor 114a and counter 114b enables any of the tracks on record disc 120 to be randomly accessed. For example, if an additional register and comparator are provided, the additional register may be preset, or loaded, with a representation corresponding to a desired track. As is appreciated, this representation, or address, of the desired track likewise is a representation of the radius of that track. Then, relative radial movement may be provided between record disc 120 and the scanning beam. This movement is sensed by sensor 114a, and counter 114b is incremented (or decremented) such that its count corresponds to the radius, or address, of the tracks. When this changing count of counter 114b is equal to the address which is loaded into the additional register, the additional comparator may be energized so as to halt further relative movement between the record disc and the light beam. Consequently, the light beam then will be positioned at the desired track.

In the embodiment shown in FIG. 4, the intensity of the auxiliary beam which is incident on photodetector 113 is controlled by suitably adjusting light stop, or aperture, 112. Alternatively, the intensity of the beam emitted by auxiliary source 110 may be controlled as a function of the drive signal produced by position detector 114.

Figure 7:
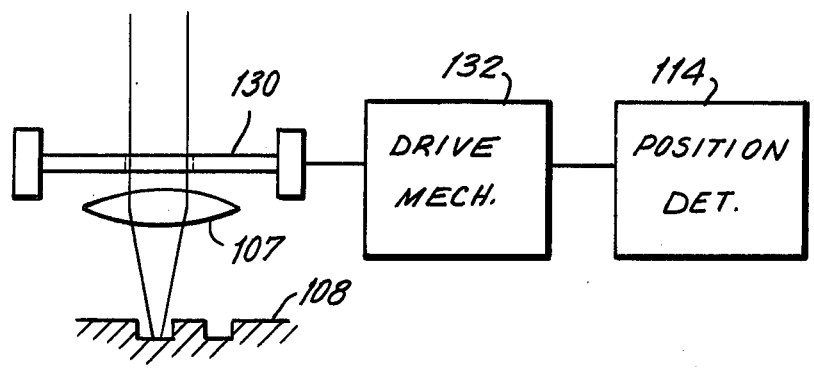
FIGS. 7 and 8 are schematic diagrams of another embodiment of the present invention.
Figure 8:
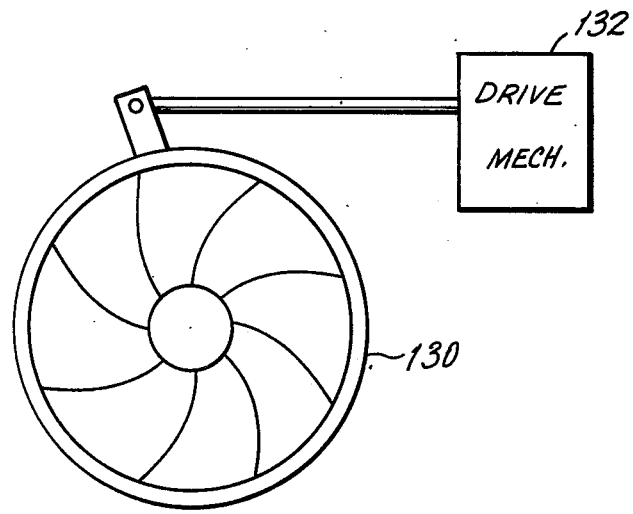

In the embodiment shown and described with respect to FIG. 4, the size of the beam spot which is derived from source 105 is controlled by suitably controlling the focus control apparatus. An alternative beam spot size control system is shown in FIGS. 7 and 8. In this alternative system, an adjustable aperture 130 is disposed in the optical path between source 105 (not shown) and the record disc. Position detector 114, described above, is coupled to a drive mechanism 132, which may be similar to drive element 115, which, in turn, is mechanically coupled to aperture 130. Thus, depending upon the detected radial position of the light beam with respect to the tracks on the record disc, position detector 114 supplies a suitable control signal to drive mechanism 132 which determines the opening of aperture 130. This opening, of course, establishes the size of the beam spot which is incident on the record disc.

Adjustable aperture 130 may comprise an iris, shown more particularly in FIG. 8, which is mechanically coupled to drive mechanism 132. Hence, as position detector 114 detects a relatively smaller radius of the track which is being scanned by the light beam, drive mechanism 132 is controlled to reduce the opening of iris 130, whereby the size of the light beam spot correspondingly is reduced. Conversely, when position detector 114 detects a relatively larger radius, drive mechanism 132 is controlled so as to establish a larger opening for iris 130, whereby the size of the beam spot is increased. A suitable linkage may be provided to couple iris 130 to drive mechanism 132.

Figure 9:
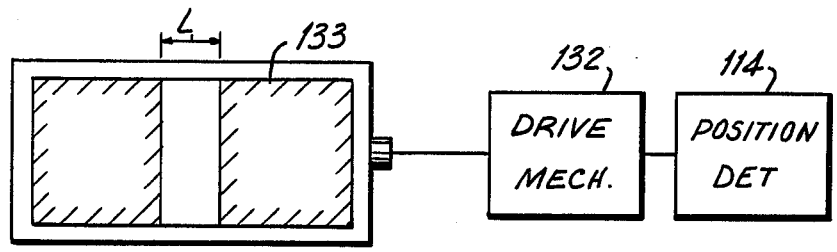
FIG. 9 is a schematic diagram of yet another embodiment of the present invention.

As a still further embodiment, the adjustable aperture may be formed as an adjustable slit 133, such as shown in FIG. 9. The length L of slit 133 is variable and is controlled by drive mechanism 132 which, in turn, is responsive to the control signal produced by position detector 114. In FIG. 9, the width of slit 133 is constant while the length L is adjustable in the direction of the length of the pits. This is achieved by positioning adjustable slit 133 such that its variable length L is parallel to the length of the pits, or the track direction, and the width of the adjustable slit is normal to the tracks, that is, it is positioned along the radial direction. Hence, with this disposition of the adjustable slit, the size of the beam spot, although variable in the longitudinal direction of the pits, is substantially constant with respect to the width of each pit.

In accordance with another aspect of the present invention, the record disc which may be used with the present invention may be of the type wherein the length of each pit is substantially independent of the information represented thereby. For example, if the record disc has FM signal information recorded thereon, the length of each pit in a given track may be constant, regardless of the variations in the frequency of the FM signals. Alternatively, if the record disc is recorded with pulse width information signals, all of the pits in a given track will have equal lengths regardless of the pulse width which is used to record such pits. Of course, even though all of the pits in each track will have equal lengths, the pit length will vary from track to track because of the aforementioned radial dependency of such lengths. The apparatus which is used to record such equal-length pits is shown as the block diagram in FIG. 10. The illustrated apparatus is comprised of a light source 145, a modulator 146, a compensator 147, and an optical focusing system 148. The purpose of light source 145, modulator 146, compensator 147 and focusing system 148 is to direct a modulated light beam onto the surface of a photosensitive layer 150 which is deposited on a substrate 149, the combination of the photosensitive layer and substrate comprising a photoresponsive recording disc. The record disc is rotated by a shaft 152 at a constant angular velocity, and an indexing mechanism (not shown) is used to provide relative radial movement between the modulated light beam and the record disc such that the modulated light beam scans concentric circular tracks across the surface of photosensitive layer 150. The resultant tracks may constitute concentric circular tracks or, alternatively, may be formed of a substantially continuous spiral track. The expression "substantially concentric circular tracks," as used throughout is intended to refer both to a spiral track and to such successive circular tracks.

Preferably, light source 145 is a laser source for emitting a laser beam which is modulated in modulator 146 and to which photosensitive layer 150 is responsive. Modulator 146 is capable of imparting an on-off modulation to the laser beam emitted by source 145. In one embodiment, a pit is recorded in the surface of photosensitive layer 140 when the laser beam is ON, and the surface of the photosensitive layer remains undisturbed when the laser beam is OFF.

Since the linear velocity of an outer track is greater than the linear velocity of an inner track, the overall light density for recording on an outer track is less than the overall light density for recording on an inner track. To avoid subjecting photosensitive layer 150 to a greater photoreaction when an inner track is recorded than when an outer track is recorded, compensator 147 is provided. The purpose of this compensator is to provide a variable attenuation of the intensity of the laser beam such that a greater attenuation is provided when an inner track is recorded than when an outer track is recorded. As an example, compensator 147 may comprise a neutral density filter, a gray scale, or the like.

Modulator 146, which may be an electro-optic modulator, an acousto-optic modulator, or the like, is controlled by pulse generating circuitry formed of a comparator 141, a differentiator 143, a monostable multivibrator, or one-shot circuit 144 and a buffer amplifier 151. Comparator 141 is coupled to an input terminal 140 to receive an information signal, such as an FM signal, or a pulse width modulated (PWM) signal. This information signal may represent video information. Comparator 141 is adapted to detect when each cycle of the FM cycle, or each pulse of the PWM signal, exceeds a reference level. In this regard, comparator 141 may comprise a differential amplifier in combination with a Schmitt trigger, and includes another input to receive a reference level, such as a level provided by a bias source 142. Comparator 141 is adapted to produce a rectangular pulse whose duration is equal to the duration of each cycle of the FM signal or each pulse of the PWM signal which exceeds the reference level established by source 142.

The comparator is coupled to differentiator 143 which is adapted to generate narrow pulses at the positive and negative transitions of the rectangular pulse produced by comparator 141. Preferably, differentiator 143 includes polarity equalizing circuitry so that the narrow pulses produced thereby all are of the same polarity, such as positive polarity. Thus, it is seen that the combination of comparator 141 and differentiator 143 is adapted to function in a manner analogous to that of a zerocrossing detector, but with the zero level being replaced by the reference level established by source 142.

Figure 10:
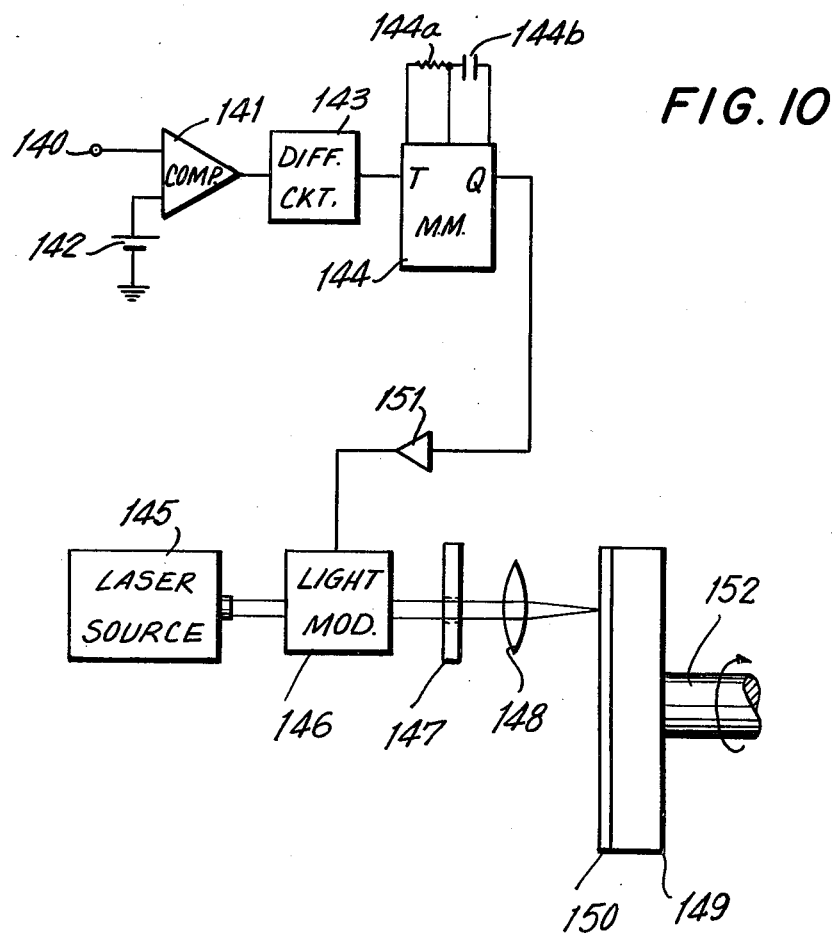
FIG. 10 is a block diagram of one embodiment of apparatus which can be used to produce the record disc used in the present invention.

Differentiator 143 is coupled to an input T of monostable multivibrator, or one-shot circuit 144. As is conventional, one-shot circuit 144 is adapted to respond to a pulse applied to its T input to be triggered from its stable state to its quasi-stable state for a duration determined by the RC time constant circuit connected thereto. As shown in FIG. 10, a resistor 144a and a capacitor 144b constitute this RC time constant circuit and are determinative of the duration in which one-shot circuit 144 remains in its quasi-stable state. The one-shot circuit also is provided with a Q output which supplies a pulse signal when the one-shot circuit is triggered to its quasi-stable state. Hence, the duration of the output pulse produced by the one-shot circuit is equal to the RC time constant of this circuit. This pulse signal is coupled via buffer amplifier 151 to a modulating input of modulator 146.

Figure 11A:
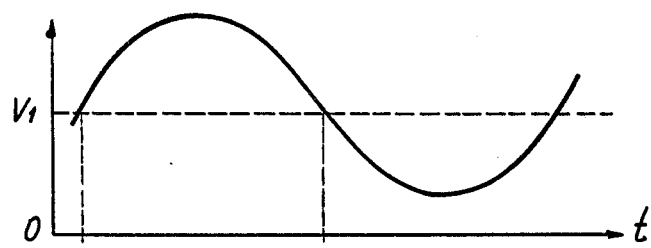
FIGS. 11A–11E are waveform diagrams which are useful in understanding the operation of the apparatus shown in FIG. 10.
Figure 11B:
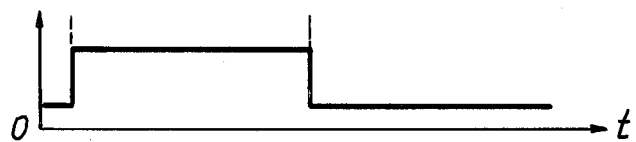
Figure 11C:
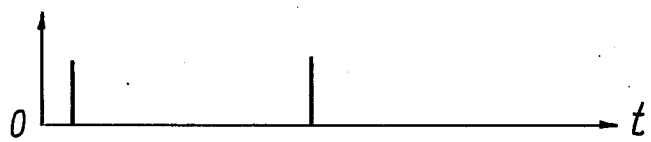

The operation of the apparatus illustrated in FIG. 10 now will be described with respect to the waveforms shown in FIGS. 11A–11E. It is assumed that the information signal which is applied to input terminal 140 is an FM signal, as shown in FIG. 11A. This FM signal is compared in comparator 141 to the clipping level represented by the broken line $V_1$ shown in FIG. 11A and produced by source 142. The output of comparator 141, which includes a Schmitt trigger stage, is the pulse shown in FIG. 11B, this pulse having a duration which is equal to that portion of the FM signal which exceeds the clipping level $V_1$. The positive and negative transitions of the pulse shown in FIG. 11B are differentiated by differentiator 143, resulting in the positive narrow pulses shown in FIG. 11C. As is readily apparent, the separation between the pulses of FIG. 11C is a function of the frequency of the FM signal which is applied to input terminal 140. As this frequency increases, the pulse separation is reduced; and as this frequency decreases, the pulse separation is increased.

Figure 11D:
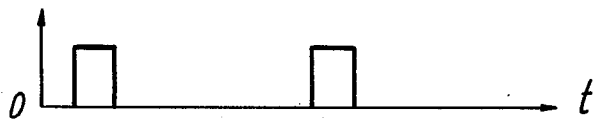
Figure 11E:
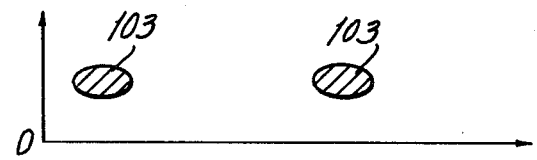

Each pulse produced by differentiator 143 triggers one-shot circuit 144 to its quasi-stable state, resulting in the output pulses shown in FIG. 11D at output terminal Q. These pulses are applied by buffer amplifier 151 to modulator 146 so as to turn ON the laser beam which is transmitted to the surface of photosensitive layer 150 of the record disc. Hence, a pit 103 (FIG. 11E) is recorded in the track being scanned by the laser beam, this pit having a length which is determined by the pulse duration of the output pulses shown in FIG. 11D and produced by one-shot circuit 144. Since the duration of the pulses shown in FIG. 11D is determined solely by the RC time constant of the one-shot circuit, the length of each pit 103 recorded in a given track is constant and is independent of the frequency component of the FM signal shown in FIG. 11A. Of course, the separation between successive pits is a function of the FM signal information.

If the duration of each pulse produced by one-shot circuit 144 is represented as t, and if the angular velocity of the record disc is represented as $\omega$, then the length l of each pit is dependent solely on the radius of the track in which that pit is recorded, such that $l=\omega rt$.

After photosensitive layer 150 is exposed to the modulated laser beam in the manner described above, the photosensitive layer is suitably developed and a master disc is produced. This master then can be employed for the mass production of large numbers of corresponding record discs, as by producing a mother and a stamper therefrom, in accordance with the usual techniques involved in the production of phonograph record discs.

Thus, if the record disc which is produced by the apparatus shown in FIG. 10 is used with the present invention, a proper relationship between the size of the scanning beam spot and the length of the pits will be maintained, even as the pit length varies as a function of the radius of the track in which the pit is recorded, merely by changing the size of the beam spot as a function of the radius of the track then being scanned. Accordingly, a signal reproduction operation can be achieved with minimum crosstalk and interference and with a good S/N ratio.

While the present invention has been particularly shown and described with reference to certain preferred embodiments, it will be readily apparent that various changes and modifications in form and details may be made by one of ordinary skill in the art without departing from the spirit and scope of the invention. For example, and as mentioned above, the signal information which is represented by the pits may be either FM information or PWM information. As another example, and as may be appreciated, the record disc with which the present invention can be used to reproduce information may be of the type having its pit lengths determined independently of the information represented thereby, or may be dependent upon such information. As a further example, indicia 122, shown in FIG. 5 and used to detect the radial position of the scanning beam may be replaced by any desired index or scale for this purpose. It is intended that the appended claims be interpreted as including the foregoing as well as various other such changes and modifications.

What is claimed is:

1. A method of reproducing information which is recorded in the form of spaced apart pits disposed in substantially concentric circular tracks of a rotatable record medium, said method comprising the steps of scanning said tracks with a light beam; detecting the radius of the respective track being scanned; and changing the size, at least in the direction along said tracks, of the scanning light beam as a function of said detected radius such that the size of the scanning beam is larger when the detected radius of the track being scanned is larger.

2. The method of claim 1 wherein said step of scanning includes rotating said record medium at a constant angular velocity.

3. The method of claim 2 wherein said step of changing the size of the scanning light beam comprises adjusting the size of an aperture, through which said light beam is transmitted, directly as a function of said detected radius.

4. The method of claim 2 wherein said step of detecting the radius of the respective track being scanned comprises providing relative movement in the radial direction of said rotating record medium between said record medium and said light beam; and deriving an encoded representation of the relative radial position of said light beam with respect to said record medium.

5. A method of reproducing information which is recorded in the form of spaced apart pits disposed in substantially concentric circular tracks of a rotatable record medium, said method comprising the steps of rotating said record medium at a constant angular velocity; scanning said tracks with a light beam; detecting the radius of the respective track being scanned; and changing the size of the scanning light beam as a function of the detected radius such that the size of the scanning beam is larger when the detected radius of the track being scanned is larger; said changing of the size of the scanning light beam being effected by generating an auxiliary beam; focusing both said first-mentioned light beam and said auxiliary beam onto said record medium; sensing the intensity of the auxiliary beam reflected from said record medium; changing the intensity of said reflected auxiliary beam as a function of said detected radius; and adjusting the focus condition of said first mentioned light beam and said auxiliary beam in accordance with the sensed intensity of said auxiliary beam to compensate for a change in said intensity of said reflected auxiliary beam.

6. Apparatus for reproducing information from a rotatable record medium, said information being recorded as spaced apart optically detectable pits in substantially concentric circular tracks on a surface of said record medium, said apparatus comprising means for rotating said record medium at a constant angular velocity; a light source for providing a light beam, whereby said light beam is modulated with the information represented by said pits; means for recovering said information from the modulated light beam; detecting means for detecting the radial position of the light beam with respect to said tracks; and adjusting means for adjusting the size, at least in the direction along said tracks, of the light beam incident on said record medium as a function of said detected radial position.

7. The apparatus of claim 6 wherein said detecting means includes detectable indicia for indicating the radial position of the light beam, said indicia being mounted on a first support, indicia sensing means operative to sense said detectable indicia and to produce output signals representative thereof, said indicia sensing means scanning said indicia as said light beam scans said tracks; and means coupled to said indicia sensing means for generating an output signal corresponding to said sensed indicia.

8. The apparatus of claim 6 wherein said spaced apart pits represent frequency modulated information signals.

9. The apparatus of claim 6 wherein said adjusting means comprises an adjustable aperture disposed in the optical path between said light source and said record medium; and drive means for controlling the size of said aperture as a function of said detected radial position.

10. The apparatus of claim 9 wherein said aperture comprises an iris.

11. The apparatus of claim 9 wherein said aperture is constituted by a slit adjustable in the direction along said tracks.

12. Apparatus for reproducing information from a rotatable record medium, said information being recorded as spaced apart optically detectable pits in substantially concentric circular tracks on a surface of said record medium, said apparatus comprising means for rotating said record medium at a constant angular velocity; a light source for providing a light beam; scanning means for scanning said tracks with said light beam, whereby said light beam is modulated with the information represented by said pits; means for recovering said information from the modulated light beam; detecting means for detecting the radial position of the light beam with respect to said tracks; and adjusting means for adjusting the size of the light beam incident on said record medium as a function of said detected radial position; wherein the size of each pit is independent of the information represented thereby but is directly related to the radius of the track in which it is recorded; and said adjusting means adjusts the size of said light beam in direct relation to the radius of the track being scanned thereby, such that a constant relationship is maintained between the size of the incident light beam and the length of the scanned pits.

13. Apparatus for reproducing information from a rotatable record medium, said information being recorded as spaced apart optically detectable pits in substantially concentric circular tracks on a surface of said record medium, said apparatus comprising means for rotating said record medium at a constant angular velocity; a light source for providing a light beam; scanning means for scanning said tracks with said light beam, whereby said light beam is modulated with the information represented by said pits; means for recovering said information from the modulated light beam; detecting means for detecting the radial position of the light beam with respect to said tracks; and adjusting means for adjusting the size of the light beam incident on said record medium as a function of said detected radial position; said adjusting means including means for transmitting an auxiliary light beam, focus means common to the first-mentioned and to said auxiliary light beams for establishing a focusing condition for the respective beams on said record medium, sensing means for sensing the intensity of said auxiliary light beam after said auxiliary light beam impinges upon said record medium, focus adjust means responsive to said sensing means for adjusting the focus condition of said respective beams in accordance with the sensed intensity of said auxiliary light beam, and means for changing the intensity of said auxiliary light beam as a function of said detected radial position of said first light beam.

14. The apparatus of claim 13 wherein said focus means comprises a lens; and said focus adjust means comprises lens drive means to adjust the position of the lens in accordance with the sensed intensity of said auxiliary light beam for increasing the size of the respective beams on said record medium when the radius of the track being scanned is larger and for reducing the size of the respective beams on said record medium when the radius of the track being scanned is smaller.

15. The apparatus of claim 14 wherein said means for changing the intensity of said auxiliary light beam comprises a controllable light stop interposed in the optical path of said auxiliary light beam between said record medium and said sensing means; and means for controlling said light stop as a function of said detected radial position of said first light beam.

16. The apparatus of claim 15 wherein said means for recovering said information from the modulated light beam and said sensing means each includes photodetecting means disposed to receive a respective one of said light beams reflected from said record medium.

17. Apparatus for reproducing information from a rotatable record medium, said information being recorded as spaced apart optically detectable pits in substantially concentric circular tracks on a surface of said record medium, said apparatus comprising means for rotating said record medium at a constant angular velocity; a light source for providing a light beam; scanning means for scanning said tracks with said light beam, whereby said light beam is modulated with the information represented by said pits; means for recovering said information from the modulated light beam; detecting means for detecting the radial position of the light beam with respect to said tracks; and adjusting means for adjusting the size of the light beam incident on said record medium as a function of said detected radial position and which includes an adjustable slit disposed in the optical path between said light source and said record medium; and drive means for controlling the size of said slit as a function of said detected radial position; and wherein the width of said slit is constant and the length of said slit is adjustable in the direction of the length of said pits.

18. Apparatus for reproducing information from a rotatable record medium, said information being recorded as spaced apart optically detectable pits in substantially concentric circular tracks on a surface of said record medium, said apparatus comprising means for rotating said record medium at a constant angular velocity; a light source for providing a light beam; scanning means for scanning said tracks with said light beam, whereby said light beam is modulated with the information represented by said pits; means for recovering said information from the modulated light beam; detecting means for detecting the radial position of the light beam with respect to said tracks; and adjusting means for adjusting the size of the light beam incident on said record medium as a function of said detected radial position; said detecting means including detectable indicia mounted on a first support, indicia sensing means operative to sense said detectable indicia and to produce output signals representative thereof, said indicia sensing means scanning said indicia as said light beam scans said tracks, and means coupled to said indicia sensing means for generating an output signal corresponding to said sensed indicia, and said means for generating an output signal including counting means for accumulating a count as said indicia sensing means scans said indicia, said count representing the radial position of said light beam, and converting means for converting said count to a radial position signal.

* * * * *